Nov. 3, 1970 TOICHIRO TSUTSUI 3,537,289
METHOD OF PRODUCING WEBBED STEEL PIPES
Filed Oct. 24, 1967 2 Sheets-Sheet 1

INVENTOR.
Toichiro Tsutsui
BY
Robert D. Flynn
ATTORNEY

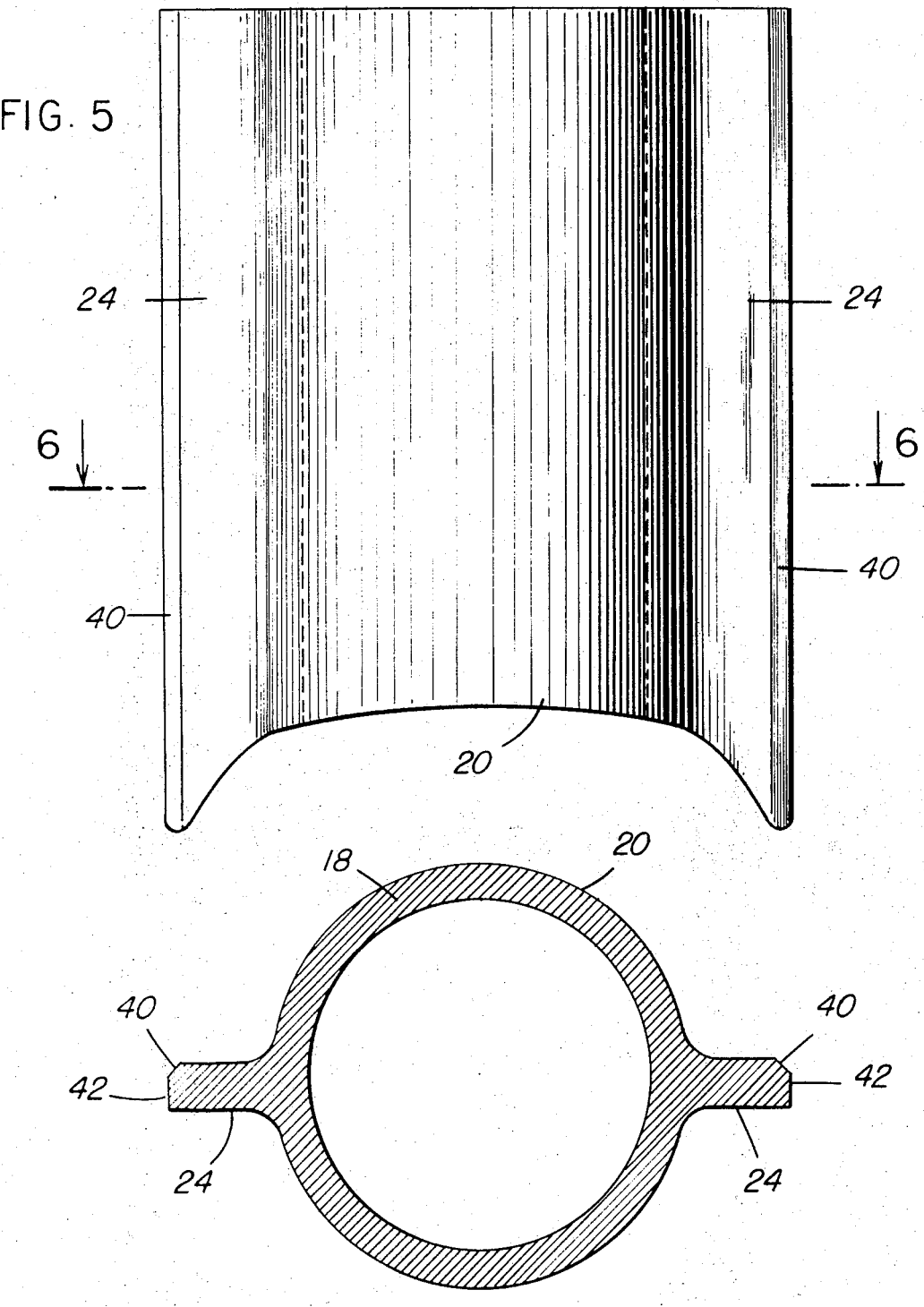

# United States Patent Office 3,537,289
Patented Nov. 3, 1970

3,537,289
METHOD OF PRODUCING WEBBED STEEL PIPES
Toichiro Tsutsui, Tokyo, Japan, assignor to Nippon
Kokan Kabushiki Kaisha, Tokyo, Japan
Filed Oct. 24, 1967, Ser. No. 678,164
Claims priority, application Japan, Oct. 24, 1966,
41/69,669
Int. Cl. B21b 17/10
U.S. Cl. 72—209                                 9 Claims

ABSTRACT OF THE DISCLOSURE

This invention relates to a method of producing webbed steel pipe constituted of forming the basic pipe conduit and web portions by a hot forming process and then, if required, cold drawing the pipe to finish dimensions. The hot forming may be an extrusion process, or preferably, plug mill rolling the pipe material under predetermined conditions. Subsequently, the webbed pipe may be cold drawn to accurate dimensions. By cold drawing the pipe web at a higher rate than the conduit portion, an accurate web is formed without detrimental effects on the pipe itself. Cold drawing also permits formation of a bevel edge on the webs adapted to facilitate welding of the pipe to adjacent pipes when used as boiler pipes or furnace walls.

---

This invention relates to a method of producing webbed steel pipe and, more particularly, to an improved method of forming steel pipe having accurately dimensioned web portions.

As used herein in keeping with terms of the art, the term "webbed pipe" is interchangeable with the terms "finned tube" and "finned tubing."

In industry, the demand for webbed steel pipe, to be employed as boiler tubes for furnace walls, is steadily and rapidly increasing. Webbed steel pipes, when utilized in this manner have been found to be easily mountable in boilers, generally superior in their heat conducting abilities, thereby enhancing the heat resisting properties of the furnaces and increasing furnace life, while concurrently facilitating reductions in boiler weight. These desirable features of webbed steel pipe are extremely important aspects in the manufacture of economical, low cost furnace installations.

Heretofore, webbed steel pipe has been produced either by a hot extrusion process, or by separately forming pipe conduit and web sections and subsequently welding these sections, through electrical arc welding or other suitable welding means, into the desired webbed pipe configuration. Each of these prior art methods of producing webbed steel pipe is subject to serious drawbacks, such as the requirement for expensive and cumbersome processing equipment, and a pronounced tendency of webbed steel pipe produced by these methods to markedly deviate from allowable dimensional tolerances. Basically, webbed steel pipes are only infrequently employed as a single or unitary item, but are used in multiples with the webs of parallel or adjoining contiguous pipes being welded together so as to provide essentially a pipe or boiler tube wall. Consequently, it is of prime importance that the webs of the webbed steel pipes be accurately dimensioned during production in order to facilitate the economical manufacture of assembled webbed steel pipes. The aforementioned methods of webbed steel pipe manufacture, however, do not lend themselves to the efficient low cost production of accurately dimensioned webbed steel pipes.

In order to obviate the foregoing and other disadvantages and drawbacks encountered in the prior art, the present invention contemplates a novel and unique method of producing accurately dimensioned finished webbed steel pipes. Essentially, the present invention provides for the production of a basic pipe conduit portion, having integral projecting web portions, by means of hot extruding or hot drawing using a plug rolling mill, and then, if desired, cold drawing the webbed steel pipe to the required finish dimensions. In effect, the inventive method of producing webbed steel pipes completely eliminates the need for expensive welding equipment, or other specially designed machining apparatus heretofore required in producing accurately dimensioned webbed pipes.

Further novel features in the present inventive method of forming or producing webbed steel pipe lie in the utilization of an improved cold drawing sequence, whereby in forming the web portion of the pipe into its final dimensions, a greater drawing reduction rate is employed for the web portion than that for the pipe conduit portion. This, in effect, will avoid the formation of undesirable drawings or deformations within the pipe conduit portion, while concurrently facilitating the formation of extremely accurately finish dimensioned pipe webs. Another feature of the present invention lies in the use of a unique reduction schedule or ratio for obtaining such accurate web dimensioning, heretofore unattainable in prior art, webbed steel pipe manufacturing methods. While forming the accurately dimensioned webbed steel pipe, the present method also permits the simultaneous formation of a bevelled and edge surface on the tip of the pipe web portions, thereby permitting parallel or adjacent contiguous webbed pipes to be welded together without the need for further preparation of the pipe welding surfaces.

The aforedescribed inventive webbed steel pipe manufacturing method produces a finished pipe product which is accurately dimensioned, not only from a basic pipe formed by a conventional plug rolling mill, but also formed by other rolling or hot extrusion processes, without the need for expensive equipment and in an efficient and economical manner.

Accordingly, it is an object of the present invention to provide an improved and novel method for the manufacture of webbed steel pipe.

Another object of the present invention is to provide a method for the manufacture of accurately finish dimensioned webbed steel pipe through a cold drawing process.

A further object of the present invention is to provide a method for producing finish dimensioned webbed steel pipe through a cold drawing process employing a differential drawing reduction ratio between the pipe portion and the web portion of the pipe.

A still further object of the present invention is to provide a method for producing webbed steel pipe as described hereinabove whereby the webs of the pipe are adapted to be welded to the webs of parallel or adjoining contiguous pipes without the need for further preparation of the welding surfaces.

These and other objects and many attendant advantages of this invention will be readily appreciated as the same becomes better understood by reference to the following detailed description when considered in connection with the accompanying drawings in which:

FIG. 5 illustrates an end portion of webbed steel pipe after cold drawing according to the present invention; and FIG. 6 is a sectional view along line 6—6 in FIG. 5.

Referring now in detail to the drawings, the preferred method of producing finish dimensioned webbed steel pipe is by initially forming the basic pipe and web portions through hot rolling in a plug rolling mill. The webbed pipe is formed by boring simple steel pipe, which has been heated to a predetermined temperature, with a conventional piercer, such as a Mannesmann piercer (U.S. Pat. No. 721,210) widely used in the industry, and then forming the rudimentary web portions on the pipe surface.

Figure 4:
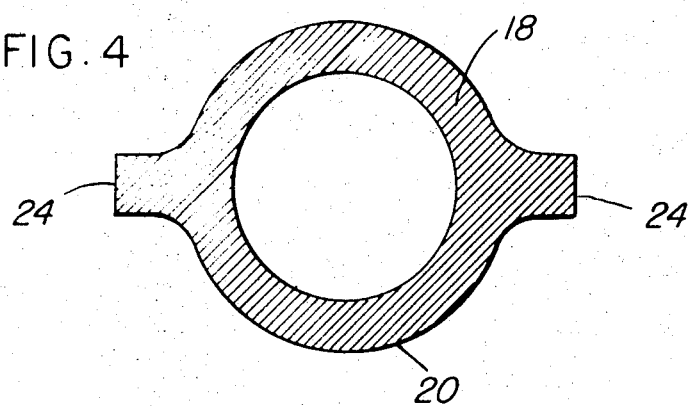
FIG. 4 illustrates a sectional view of pipe produced by a plug rolling process.

If circular pipe is desired, then the pipe material (i.e., the hollow piece) is passed between cooperating upper die roller 10 and lower die roller 12, also known as calibers, of a plug roller mill. A circular plug 14, which is fastened to a suitable guide rod 16 is positioned between the guide rollers 10 and 12, thereby forming an annular chamber which will determine the wall thickness 18 of a webbed steel pipe 20, as shown in FIG. 4 of the drawings.

Figure 1A:
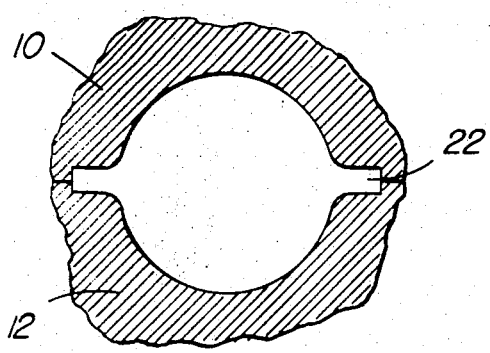
FIGS. 1a to 1d illustrate four typical embodiments of plug rolling mill dies or caliber for producing the basic pipe conduit and web portions of webbed steel pipe.
Figure 1C:
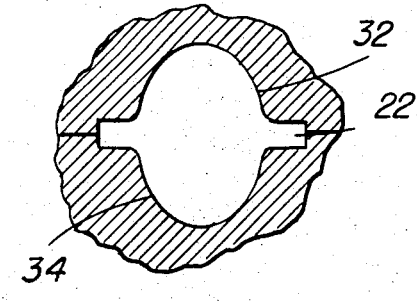
Figure 1B:
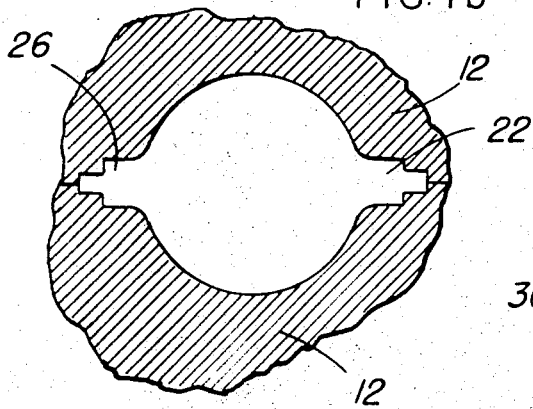
Figure 1D:
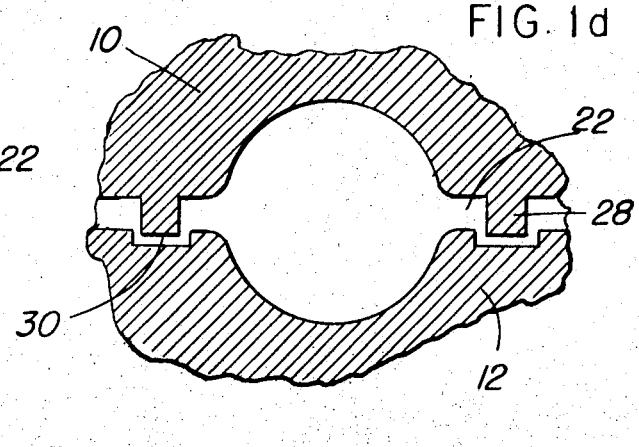
Figure 2:
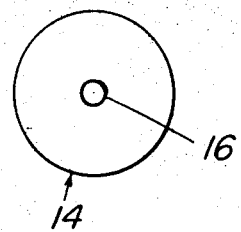
FIG. 2 illustrates a rolling mill plug used in conjunction with the dies or calibers of FIGS. 1a, 1b and 1c.
Figure 3:
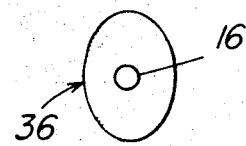
FIG. 3 illustrates a rolling mill plug used in conjunction with the die or caliber of FIG. 1c.

A gap 22 between die rollers 10 and 12 will cause material to flow outwardly so as to form a pair of oppositely projecting web portions 24 on pipe 20. In order to obtain web dimensions or shapes of greater accuracy, gaps 22 may be stepped as shown at 26 in FIG. 1b, or die roller 10 may have depending portions 28 adapted to cooperate with recess portions 30 in die roller 12 as shown in FIG. 1d of the drawings. When webbed pipe of elliptical cross-section is desired, semi-elliptical die rollers or calibers 32 and 34 may be substituted for semi-circular die rollers 10 and 12. In this connection, when employing the elliptical die rollers 32 and 34 shown in FIG. 1c of the drawings, elliptical plug 36 attached to guide rod 16 may be substituted for circular plug 14.

The pipe material (that is, the hollow piece) is passed between the die rollers or calibers for a successive number of rolling passes and subjected to a compressive force (a heavy rolling reduction) without rotation of the pipe material. This will produce the web portions and increase them to the required size through radially outward flow of the pipe material. The application of the pressure on the pipe material is divided into several steps, one application for each pass of the pipe material between the die rollers or calibers. Experimentation has shown that it is a requirement to use a plug for the final pass having a diameter approximately 1 to 5 mm. larger than the diameter of the plug used for the immediately preceding pass. Using plugs for the final pass having dimensional variations outside of the range indicated above is generally likely to produce defects in the pipe form. In extreme cases "drawings" or projections are produced within the pipe conduit wall, which may considerably lower the commercial value of the webbed steel pipe.

The following example is illustrative of a webbed steel pipe produced by hot rolling in a plug rolling mill in accordance with the present invention.

EXAMPLE I

Material: Carbon steel produced by LD converter,
Chemical composition: C: 0.14%, Si: 0.20%, Mn: 0.50%, P: 0.01%, S: 0.022%, Cu: 0.06%.
Sample: A round steel piece having a diameter of 120 mm. and weighing 136 kg. is formed according to any well-known process.

| The dimensions after piercing of sample: | Mm. |
|---|---|
| Outer diameter | 112 |
| Inner diameter | 78 |
| Thickness | 17.0 |
| Length | 4,420 |

REDUCTION SCHEDULE (PLUG MILL)

| Pass: | Caliber diameter (mm.) | Outer diameter (mm.) | Plug diameter (mm.) | Thickness (mm.) | Roll gap (mm.) | Web width (mm.) | Web thickness (mm.) |
|---|---|---|---|---|---|---|---|
| 1 | 96 | 95 | 66 | 14.5 | 10 | 104.7 | 14.0 |
| 2 | 86 | 85 | 61 | 12.0 | 10 | | |
| 3 | 77 | 76 | 56 | 10.0 | 10 | 99.0 | 10.5 |
| 4 | 77 | 76 | 59 | 8.5 | 6 | | |
| 5 | 77 | 76 | 62 | 7.0 | 6 | 99.5 | 9 |

In the reduction schedule shown above, the caliber shown in FIG. 1a is used for Nos. 1 to 3 passes, with roll gap 22 set at 10 mm. so as to form the web portions 24 freely and to extend them in successive passes. Then from No. 4 pass on, said web portions 22 are formed with the caliber shown in FIG. 1b, and at the same time using plug 14 for the No. 5 pass having a diameter 3 mm. larger than that of the plug for No. 4 pass so as to produce the webbed steel pipe 20 as shown in FIG. 4. The accuracy of dimensions of the web portion thus obtained is highly satisfactory, and presents an excellent form without producing drawings (i.e. sink mark or plug jumping) at the pipe conduit.

The webbed steel pipe 20 produced by the above process presented a form as shown in FIG. 4, and according to the experiments made, it produced an excellent result as a heat radiating pipe for a furnace or boiler installation.

However, since it has been found that there are variations in dimensions which cannot be ignored in the above described hot rolling, namely when a plurality of webbed steel pipes as shown in FIG. 4 are arranged side by side and welded together, it was found that difficulties in welding were experienced due to said dimensional variations. The difficulties in the welding are greatly increased by the shape of the end surface of the webs 24 shown in the FIG. 4 of the drawing. Accordingly, in the present invention, the webbed pipe 20 shown in FIG. 4 is passed through a cold drawing bench as a finishing process subsequent to said hot rolling process.

In subjecting the webbed steel pipe 20 to the cold drawing process or step, as shown in FIG. 5 of the drawings, the difficulties encountered in obtaining accurately dimensioned webs are avoided. The cold drawing process, which is an important feature of the present invention, requires no particular special equipment. However, certain conditions must be maintained during the cold drawing process. One condition is that the drawing reduction rate of the web portion 24 should be larger than that of the pipe wall 18. In this manner no drawings will be formed inside the pipe corresponding to the web portion 24 formed by the rolling in the plug mill. At the same time, the dimensional accuracy of the web portion is improved, and it is possible to attain dimensional accuracies of ±0.1 mm. in the width of the web portion, ±0.15 mm. in the thickness thereof, and at a bevel surface 40, especially formed on the edge 42 of the web portion 24, the accuracy may be maintained within ±0.1 mm.

The bevel surface 40 may be readily obtained by simply choosing the form of the cold drawing dies. The formation of the bevel surface 40 when joined to a parallel or contiguous bevel surface on an adjoining webbed steel pipe will provide an excellent welding seam without requiring additional finishing or processing.

A cold drawing process according to the present invention is now explained, referring to the drawings. FIG. 5 illustrates an end portion of the pipe after the cold drawing process, whereas FIG. 6 shows a cross-section thereof. As shown in FIG. 5, since the reduction rate of the web portion 24 is greater than that of the pipe proper, the web portion is drawn longer at the end portion. This, in effect, increases the dimensional accuracy of the beveling at the web portion, and no drawings are formed within the pipe conduit corresponding to the web portions. The cold drawing process preferably may bet set up in two-pass steps, that is, rough and finishing steps. According to experimentation, it has been found that the preferable ratio of reduction rate of the web portions to that of the pipe conduit should be higher than 1.05. In the case where the ratio is below 1.05, drawings are apt to appear in the pipe conduit and there may be a possibility of generating twisting in the pipe. On the other hand, when the reduction ratio is more than 1.3, detrimental scoring or lateral cracking of the pipe may be produced. By selecting an appropriate ratio range as given above, the reforming operation usually accompanying the manufacture of hot treated products and the beveling operation for welding becomes unnecessary.

By way of example, a webbed pipe was cold drawn as set out below.

EXAMPLE II

Material: Low alloy steel produced in an open hearth furnace,

Chemical composition: C: 0.12%, Mn: 0.43%, P: 0.016%, S: 0.007%, Si: 0.74%, Cu: 0.08%, Cr: 1.21%, Mo: 0.54%.

Sample: A round steel bar having a diameter of 125 mm. and weighing 94 kg. is formed according to any well known process, and extruded at 1830° C. in an ordinary heating furnace.

Dimensions of the bore piece (Mannesmann's piercer) are:

|  | Mm. |
|---|---|
| Outer diameter | 1.27 |
| Inner diameter | 87 |
| Thickness | 20 |
| Length | 1830 |

Dimensions after rolling in a plug rolling mill according to the present invention are:

|  | Mm. |
|---|---|
| Outer diameter | 87 |
| Thickness of pipe proper | 10.6 |
| Width of web | 113 |
| Thickness of web | 9.5 |
| Length | 4200 |

The dimensions after cold drawing according to the present invention are:

|  | Mm. |
|---|---|
| Outer diameter | 76.2 |
| Thickness of pipe proper | 8.8 |
| Width of web | 95.0 |
| Thickness of web | 9.0 |
| Ratio of reduction rate (S) | 1.10 |

Proper beveling was formed at the edge of the web portion, and the dimensional accuracy of each part of the formed webbed pipe was found to be within a satisfactory range of ±0.10 mm.

Another further advantageous feature of the cold drawing process according to the present invention is that this step is quite effective when applied on basic pipes which have been hot formed or extruded as in the prior art. Generally, hot extruded webbed pipe hot web portions tend to form an irregular arc at the tip, including pits and holes. The disadvantage of the hot extrusion process as compared with the plug mill has already been described, but a further example applying the cold drawing process according to the present invention on a basic pipe obtained by the hot extrusion process will now be set forth.

EXAMPLE III

Material: the same as in Example I.

Chemical composition: the same as in Example I.

Dimensions of webbed steel pipe the base pipe of which being produced by hot extrusion process:

|  | Mm. |
|---|---|
| Outer diameter | 70 |
| Thickness of pipe | 5.5 |
| Width of web | 85 |
| Thickness of web | 7.5 |

Dimensions after cold drawing by the process according to the present invention, using bevel forming dies for producing welding surfaces are:

Outer diameter: 63.3 mm.
Thickness of pipe: 4.55 mm.
Reduction ratio (S): 1.107.
Width of web: 76.2 mm.
Thickness of web: 6.5 mm.

The dimensional accuracy of various parts of the product thus obtained was less than ±0.05 mm. for each thereof, and an excellent webbed pipe product was obtained.

What is claimed is:

1. A method of producing hollow steel tubing having fins extending from the outer surface thereof in a plug rolling mill, comprising the steps of:
   passing a hollow tube through a pair of spaced rolls and over a plug having a given diameter, to form fins between the gap formed between said spaced rolls; and
   substantially removing sink marks from the inner surfaces of said tubing in the vicinity of said fins and from the portions of the outer surface of said tubing from which said fins extend by subsequently passing said finned tubing, in the final pass, through a pair of spaced rolls and over a plug having a diameter which is larger than the plug utilized in the immediately preceding pass step.

2. A method according to claim 1 wherein said fins are first formed by a hot rolling step.

3. A method according to claim 1 further comprising the step of subsequently cold drawing said finned tubing to effect a section reduction rate to said fin in excess of the section reduction rate of the body to said tubing.

4. A method as defined in claim 3 wherein said body and fin portions are cold drawn by means of drawing dies adapted to form a bevel surface along at least one edge of each fin portion.

5. A method as defined in claim 3 wherein the ratio of the section reduction rate of said fin portions to that of said tube body is in the range of from about 1.05 to about 1.30.

6. A method as defined in claim 1 wherein said plug diameter during the final pass step is from about 1 to about 5 mm. larger than in said immediately preceding pass step.

7. A method of producing finned steel tube, comprising the steps of:
   rolling by a hot extrusion process, to form a tube body having fin portions, the fin portions having dimensions which are larger than the required fin size in the final product, and
   substantially removing sink marks from the inner surfaces of said tubing in the vicinity of said fins and from the portions of the outer surface of said tubing from which said fins extend by cold drawing said tube to effect a section reduction rate to said fin in excess of the section reduction rate of said body.

8. A method as defined in claim 7 wherein said body and fin portions are cold drawn by means of drawing dies adapted to form a bevel surface along at least one edge of each fin portion.

9. A method as defined in claim 7 wherein the ratio of the section reduction rate of said fin portion to that of said tube body is in the range of from about 1.05 to about 1.30.

References Cited

UNITED STATES PATENTS

| 311,477 | 2/1885 | Fisher et al. | 72—209 |
| 631,851 | 8/1899 | Keithley | 72—209 |
| 721,210 | 2/1903 | Mannesmann | 72—209 |
| 988,569 | 4/1911 | Harkness | 72—209 |

MILTON S. MEHR, Primary Examiner